United States Patent
Sarkijarvi et al.

(10) Patent No.: US 8,442,349 B2
(45) Date of Patent: May 14, 2013

(54) REMOVAL OF ARTIFACTS IN FLASH IMAGES

(75) Inventors: Juha Seppo Sarkijarvi, Tampere (FI); Ossi Mikael Kalevo, Toijala (FI); Sakari Tapio Alenius, Lempaala (FI)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 12/520,805

(22) PCT Filed: Dec. 22, 2006

(86) PCT No.: PCT/IB2006/055024
§ 371 (c)(1),
(2), (4) Date: May 11, 2010

(87) PCT Pub. No.: WO2008/078153
PCT Pub. Date: Jul. 3, 2008

(65) Prior Publication Data
US 2010/0278452 A1    Nov. 4, 2010

(51) Int. Cl.
*G06K 9/40*   (2006.01)
(52) U.S. Cl.
USPC .......... 382/275; 382/307; 382/254; 382/118; 382/266
(58) Field of Classification Search .......... 382/275
See application file for complete search history.

(56) References Cited

U.S. PATENT DOCUMENTS

| | | | |
|---|---|---|---|
| 4,285,588 A | 8/1981 | Mir | |
| 6,859,565 B2 * | 2/2005 | Baron | 382/275 |
| 7,184,059 B1 * | 2/2007 | Fouladi et al. | 345/604 |
| 7,450,756 B2 * | 11/2008 | Bloom et al. | 382/167 |
| 7,732,769 B2 * | 6/2010 | Snider et al. | 250/336.1 |
| 7,738,015 B2 * | 6/2010 | Steinberg et al. | 348/223.1 |
| 7,830,418 B2 * | 11/2010 | Ulichney et al. | 348/221.1 |
| 7,873,189 B2 * | 1/2011 | Jee et al. | 382/118 |
| 7,916,971 B2 * | 3/2011 | Bigioi et al. | 382/275 |
| 8,116,859 B2 * | 2/2012 | Maison-Blanche et al. | 600/516 |
| 8,175,355 B2 * | 5/2012 | El Fakhri et al. | 382/128 |
| 2002/0150306 A1 | 10/2002 | Baron | |

(Continued)

FOREIGN PATENT DOCUMENTS

| | | |
|---|---|---|
| DE | 102004016564 A1 | 2/2006 |
| EP | 1233606 A | 8/2002 |

(Continued)

OTHER PUBLICATIONS

Agraval A. Raskar R, Nyar S "Removing phtography artifacts using gradient prjection and flash exposure sampling" 2005.*

(Continued)

*Primary Examiner* — Chan S Park
*Assistant Examiner* — Iman K Kholdebarin
(74) *Attorney, Agent, or Firm* — Harrington & Smith

(57) ABSTRACT

The present invention relates to a method, a computer-readable medium, a computer program and apparatuses for removal of artifacts in flash images. Image data of a reference image captured using a first level of flash energy and image data of a main image captured using a second level of flash energy that is higher than said first level of flash energy is received. Image data of a third image is then determined based on said image data of said reference image and said image data of said main image, wherein said third image is a representation of said main image with removed artifacts.

18 Claims, 5 Drawing Sheets

U.S. PATENT DOCUMENTS

| | | | |
|---|---|---|---|
| 2003/0007687 A1 | 1/2003 | Nesterov et al. | |
| 2005/0041121 A1 | 2/2005 | Steinberg et al. | |
| 2006/0008171 A1 | 1/2006 | Petschnigg et al. | |
| 2007/0030816 A1* | 2/2007 | Kolavennu | 370/252 |
| 2007/0237364 A1* | 10/2007 | Song et al. | 382/115 |
| 2009/0148001 A1* | 6/2009 | Artyushkova et al. | 382/107 |
| 2009/0169102 A1* | 7/2009 | Zhang et al. | 382/167 |
| 2009/0285454 A1* | 11/2009 | Xu | 382/118 |

FOREIGN PATENT DOCUMENTS

| | | | |
|---|---|---|---|
| EP | 1233606 A2 * | 8/2002 | |
| EP | 1615169 A2 | 1/2006 | |
| JP | 2000102022 A | 4/2000 | |
| JP | 2003179807 A | 6/2003 | |
| JP | 2006166359 A | 6/2006 | |
| WO | 2006116744 A | 11/2006 | |
| WO | 2006116744 A1 | 11/2006 | |

OTHER PUBLICATIONS

Office Action received from Chinese Patent Application No. 200680056660.5, dated Jan. 26, 2011, 6 pages.

Office Action received from Korean Patent Application No. 2009-7015397, dated Nov. 13, 2010, 4 pages.

International Search Report and Written Opinion of the International Searching Authority for PCT Application No. PCT/IB2006/055024, dated Jul. 25, 2007, 13 pages.

Agraval et al., "Removing Photography Artifacts Using Gradient Projection and Flash-Exposure Sampling", SIGGRAPH '05: ACM SIGGRAPH 2005 Papers, Jul. 31, 2005 pp. 828-835.

Petschnigg et al., "Digital Photography With Flash and No-Flash Image Pairs" Proceedings ACM SIGGRAPH, Aug. 8, 2004, pp. 664-672.

Office Action received in corresponding Japanese Application No. 2009-538798, Dated Nov. 11, 2011, 13 pages.

"Why do people have red eyes in flash photographs?", http://electronics.howstuffworks.com/question51.htm; Nov. 8, 2012, 1 pg.

"Red-eye effect", http://en.wikipedia.org/wiki/Red-eye_effect, Nov. 8, 2012, 3 pgs.

"Automatic Red-Eye Detection and Correction", Matthew Gaubatz et al., IEEE 2002, pp. 804-807.

"Automatic Digital Redeye Reduction", Andrew Patti et al., IEEE 1998, pp. 55-59.

"An Efficient Automatic Redeye Detection and Correction Algorithm", Huitao Luo, et al., ICPR 2004, Proceedings of the 17th International Conference on Pattern Recognition, vol. 2, 23-26, Aug. 2004, pp. 883-886.

* cited by examiner

REMOVAL OF ARTIFACTS IN FLASH IMAGES

RELATED APPLICATION

This application was originally filed as PCT Application No. PCT/IB2006/055024 filed on Dec. 22, 2006.

FIELD OF THE INVENTION

This invention relates to a method, a computer-readable medium, a computer program and apparatuses for removal of artifacts in flash images.

BACKGROUND OF THE INVENTION

A well-known and particularly annoying artifact in flash images is the so-called "red-eye effect", where people's eyes appear red instead of their natural color. Therein, the red color stems from a reflection of the flash light on the blood-rich retina. The effect is particularly pronounced when the flash light is arranged near the optical axis of the camera lens, which is particularly the case when deploying small-sized cameras, such as for instance compact cameras or cameras integrated into mobile appliances (e.g. mobile phones).

The red-eye effect may be combated in a plurality of ways.

A particularly simple way is to move the flash light away from the optical axis of the camera lens, so that the camera lens does no longer receive the direct reflection of the flash light from the retina. However, this approach is in general not feasible for compact cameras or cameras that are integrated into mobile appliances due to size constraints.

According to a further approach, described in U.S. Pat. No. 4,285,588, a pre-flash is used that causes the pupil to close before the actual image is captured. The time between the pre-flash and the actual capturing of the image has to be chosen large enough to allow the pupil to close. In U.S. Pat. No. 4,285,588, a time delay of around 600 ms is preferred. This however increases the latency of image capture, and furthermore is not suited to entirely remove the red-eye effect, since the pre-flash will not cause the pupil to close completely.

Removal of the red-eye effect may furthermore be accomplished by an algorithm processing a captured image and attempting to identify and remove red eyes contained therein, for instance based on geometrical constraints prescribed by the form of the eye. However, both the rate of false and missed detections of red eyes is generally quite high.

U.S. patent application publication no. 2006/0008171 describes a further approach for red-eye removal, which relies on taking an image pair, comprising an image taken without flash and a subsequent image taken with flash. Therein, both images are taken in short succession, for instance within 1/30 of a second. The difference in red chrominance between the no-flash image and the flash image is determined, and, based on a threshold value, it is determined which regions may form potential red eyes. Subsequently, the red-eye regions are removed. However, the performance of this approach critically depends on the choice of the threshold value. Furthermore, performance further significantly degrades if the no-flash image is too dark.

SUMMARY

It is thus, inter alia, an object of the present invention to provide a method, a computer-readable medium, a computer program and an apparatus for reducing artifacts in flash images.

According to a first aspect of the present invention, a method is described, comprising receiving at least image data of a reference image captured using a first level of flash energy and image data of a main image captured using a second level of flash energy that is higher than the first level of flash energy; and determining image data of a third image at least based on the image data of the reference image and the image data of the main image, wherein the third image is a representation of the main image with removed artifacts.

According to a second aspect of the present invention, a computer-readable medium having a computer program stored thereon is described, the computer program comprising instructions operable to cause a processor to receive at least image data of a reference image captured using a first level of flash energy and image data of a main image captured using a second level of flash energy that is higher than the first level of flash energy; and instructions operable to cause a processor to determine image data of a third image at least based on the image data of the reference image and the image data of the main image, wherein the third image is a representation of the main image with removed artifacts.

According to a third aspect of the present invention, a computer program is described, comprising instructions operable to cause a processor to receive at least image data of a reference image captured using a first level of flash energy and image data of a main image captured using a second level of flash energy that is higher than the first level of flash energy; and instructions operable to cause a processor to determine image data of a third image at least based on image data of the reference image and image data of the main image, wherein the third image is a representation of the main image with removed artifacts.

According to a fourth aspect of the present invention, an apparatus is described, comprising a processor configured to receive at least image data of a reference image captured using a first level of flash energy and image data of a main image captured using a second level of flash energy that is higher than the first level of flash energy; and to determine image data of a third image at least based on image data of the reference image and image data of the main image, wherein the third image is a representation of the main image with removed artifacts.

According to a fifth aspect of the present invention, an apparatus is described, comprising means for receiving at least image data of a reference image captured using a first level of flash energy and image data of a main image captured using a second level of flash energy that is higher than the first level of flash energy; and means for determining image data of a third image at least based on image data of the reference image and image data of the main image, wherein the third image is a representation of the main image with removed artifacts.

According to the present invention, at least image data of the reference image and the main image is received and used to determine image data of a third image, wherein the third image is a representation of the main image with removed artifacts. Equally well, image data of more than two images may be received and used to determine the image data of the third image. The removal of the artifacts may be understood as a substantial or complete removal of the artifacts. The reference image has been captured with a lower level of flash energy than the main image. If more than two images are captured, the additional images (i.e. the third, fourth, etc. image) may be captured with or without flash. For instance, a viewfinder image may serve as an additional image.

The reference image may either have been captured before the main image, at least partially together with the main image (for instance with two image sensors or with an image sensor that is capable of capturing two images at a time), or may have been captured after the main image. Capturing the low-flash-level reference image after the high-flash-level main image may for instance be advantageous since the facial expression of image targets may be distracted by the low-level pre-flash. If the artifacts contained in the main image comprise the red-eye effect, the lower level of flash energy may for instance be chosen low enough so that no or only a negligible red-eye effect occurs in the reference image. However, using a flash when capturing the reference image ensures that determining the image data of the third image, when exemplarily being based on differences between image data of the reference image and the main image, yields adequate results, since it is avoided that the reference image is too dark and thus aggravates a comparison of the image data of the reference image and the main image. By using flash also when capturing the reference image, the quality of detection of potential artifact regions in the captured images is increased, so that artifact removal is rendered more robust.

The reference image and the main image may be captured under usage of different flashlights, i.e. a first type of flashlight for the capture of the reference image and a second type of flashlight for the capture of the main image. The types of flashlights used may for instance comprise, but not be limited to, a Xenon-flash, an LED-flash, or an indicator light.

The determining of the image data of the third image is performed by a processor which receives the image data of the reference image and the main image. Therein, means for capturing the reference image and the main image may for instance be integrated in the same apparatus in which also the processor is comprised, or in a separate apparatus. In the latter case, the processor then may for instance be furnished with an interface for receiving the image data of the reference image and and the main image and embodied as a module that can be integrated in an apparatus with a camera unit for capturing the reference image and the main image. The processor may read program code from a computer-readable medium, such as for instance a fixedly installed or removable memory unit, wherein the program code comprises instructions operable to cause the processor to receive the image data of the reference image and the main image and to determine the image data of the third image.

The artifacts may for instance comprise the red-eye effect, caused by reflection of flash light at the blood-rich retina of a person's eye. The artifacts may for instance also comprise the effect that flash light is reflected at the tapetum lucidum encountered in a large group of animals (comprising for instance cats and dogs), which causes these animals' eyes to unnaturally shine in different colors in the flash image. Moreover, the artifacts are understood to comprise any effect that is particularly caused by the use of flash light and changes the natural appearance or deteriorates the quality of the main image.

The determining of the image data of the third image is based on image data of the reference image and the main image. In this way, the determining does not only have to rely on image data of the main image, but also may consider changes in the image data between both images.

Therein, the image data may be analog or digital image data. The image data may for instance be raw image data as obtained from a camera unit, or may already have been transformed according to a specific color space model, such as for instance the YUV or the RGB model, or already have been transformed into a specific image format. The image data may also represent only one or more components of a color space model, such as for instance the Y, U and V components of the YUV model or the R, G and B components of the RGB model.

According to a first exemplary embodiment of the present invention, a temporal distance between the capture of the reference image and the main image is less than 100 ms. Thus either the main image is captured less than 100 ms after the reference image, or the reference image is captured less than 100 ms after the main image. For instance, in the former case, since the low-level flash used in the capturing of the reference image is not intended to condition the pupil, the dynamic properties of the pupil do not have to be considered when defining this time delay. However, it may be advantageous to define the time delay in a way that the major movement of targets between the capturing of the images is not possible. A suited value for this time delay may for instance be 30 ms or even less. According to this first exemplary embodiment, thus the latency of image capturing can be significantly reduced while still allowing for artifact removal. The temporal distance between the capture of the reference image and the main image may equally well be larger than 100 ms. For instance, if motion compensation is applied to at least one of the reference image and the main image, it may be possible to allow much larger temporal distances between the capture of the reference image and the main image, since the compensated motion in the images allows to properly compare the images as a basis for artifact removal.

According to a second exemplary embodiment of the present invention, the first level of flash energy is less than 10 percent of the second level of flash energy. The first level of flash energy may for instance be defined small enough so that specific artifacts, such as for instance the red-eye effect, do not or only to a small degree occur in the reference image, but still large enough to ensure that the reference image is not too dark and thus suited for a comparison with the main image. The level of flash energy and exposure time for the reference image may for instance be determined based on the statistics of a viewfinder image. A suited value for the first level of flash energy may for instance be 5 to 10 percent of the second level of flash energy, but may equally well be significantly smaller. The reference image and the main image may be captured under usage of the same flashlight, and only different levels of flash energy may be applied. Equally well, different types of flashlights may be used for the capture of the reference image and the main image, respectively. The first and/or second level of flash energy may then for instance be determined or bounded by the deployed type of flashlight. For instance, for the capture of the reference image, a flashlight producing a smaller level of flash energy than a flashlight used for the capture of the main image may be used.

According to a third exemplary embodiment of the present invention, the reference image has at least one of a lower quality, a lower sampling rate and a lower resolution than the main image. The lower quality, lower sampling rate or lower resolution may be advantageous since the reference image may then require less memory. The lower quality, lower sampling rate or lower resolution may be achieved during capturing of the reference image, or may be achieved after image capture by transformation of the original image obtained from a camera unit.

According to a fourth exemplary embodiment of the present invention, the determining of the image data of the third image comprises detecting artifacts in the main image under consideration of differences between the image data of the reference image and the image data of the main image; and correcting the detected artifacts to obtain the image data of the third image.

The detecting of the artifacts according to the fourth embodiment of the present invention may comprise identifying potential artifacts in the main image based on the image data of the main image; determining false identifications among the potential artifacts under consideration of the differences between the image data of the reference image and the image data of the main image; and excluding the false identifications from the potential artifacts, wherein the correcting is only performed for non-excluded potential artifacts. Therein, the identification of potential artifacts may for instance be performed by a pattern recognition algorithm, for instance by searching for face-shaped or eye-shaped patterns in the main image.

Therein, the reference image may be processed before the detecting of the artifacts in the main image. The processing of the reference image may for instance comprise equalization of the reference image so that e.g. motion, different image sizes, different exposures or other differences between the reference image and the main image are compensated.

Alternatively, the detecting of the artifacts according to the fourth embodiment of the present invention may comprise identifying potential artifacts in the main image based on the differences between the image data of the reference image and the image data of the main image; determining false identifications among the potential artifacts under consideration of the image data of the reference image or the main image; and excluding the false identifications from the potential artifacts, wherein the correcting is only performed for non-excluded potential artifacts. Performing the identification of potential artifacts based on both the reference image and the main image may contribute to reduce the complexity of the determining of false identifications among the potential artifacts.

The correcting of the detected artifacts in the fourth exemplary embodiment of the present invention may at least partially be based on the image data of the reference image. For instance, image data of the main image may be replaced by image data of the reference image to obtain the image data of the third image.

According to a fifth exemplary embodiment of the present invention, the determining of the image data of the third image comprises performing a factor analysis of a set of data formed from the image data of the reference image and the image data of the main image, and applying a transformation obtained from the factor analysis to the set of data to obtain image data of a fourth image, wherein the image data of the third image is determined at least based on the image data of the fourth image. Deploying a factor analysis allows to blindly suppress or reverse global differences between the reference image and the main image and thus avoids pattern recognition steps. It should be noted that the determining of the image data of the third image according to the fifth embodiment of the present invention is also applicable in cases where the reference image has been captured without flash, i.e. in cases where image data of a first non-flash image and image data of a second flash picture are received. The image data of the third image may then be determined based on the image data of the first non-flash image and the image data of the second flash image. Equally well, the determining of the image data of the third image according to the fifth embodiment of the present invention is applicable when more than two images are captured and then serve as a basis for the determination of the third image. Therein, said reference image and said main images may be captured with flash, and further images may be captured with or without flash. An example for the latter case is the use of a viewfinder image as a further image.

The factor analysis may for instance be a principal component analysis of the set of data, the principal component analysis determining a common part and a different part with respect to the image data of the reference image and the image data of the main image. Therein, the common part expresses the greatest variability of the joint signal, and the different part expresses the corresponding differences.

The transformation may be determined based on a transformation matrix obtained from the principal component analysis and a modified transformation matrix determined to suppress or reverse the different part. By applying the transformation matrix (in transposed form) to the set of data, the set of data is thus transformed into a new coordinate system, and by applying the modified transformation matrix, the set of data is transformed back from the new coordinate system, however in a modified way that suppresses or reverses the different part and thus the differences between the image data of the reference image and the image data of the main image.

In the fifth embodiment of the present invention, a fuzzy likelihood map may be determined based on information from the reference image and the main image, wherein the fuzzy likelihood map indicates whether parts of the main image contain an artifact or not, and the image data of the reference image and the image data of the main image may be weighted with the fuzzy likelihood map before the factor analysis is performed. In the fuzzy likelihood map, there may, for instance for each pixel, exist a value in the range [0,1], whereas the magnitude of the value expresses if the pixel is likely to be in an artifact region (e.g. a red-eye region). By weighting the image data of the reference image and the main image with the fuzzy likelihood map, the image data corresponding to artifacts is emphasized with respect to the image data not corresponding to artifacts, thus giving image data corresponding to artifacts more weight in subsequent processing. Applying a fuzzy likelihood may make the use of thresholds unnecessary and produces spatially smooth results, unlike methods where thresholds are applied and lead to visible edges between areas that are processed to remove image artifacts and non-processed areas.

In the fifth embodiment of the present invention, the image data of the third image may at least be based on the image data of the reference image, the image data of the main image and the image data of the fourth image under consideration of the fuzzy likelihood map. Furthermore, an influence of the fuzzy likelihood map may be removed from the image data of the third image.

In the fifth embodiment of the present invention, further an intensity of portions of the third image may be reduced. For instance, if the artifacts comprise the red-eye effect, the processing according to the fifth embodiment of the present invention may decrease color saturation of image data related to pupils. For darkening these pupils, the intensity may be reduced.

In the fifth embodiment of the present invention, the image data may represent components of a color space model, the determining of the image data of the third image may be performed for at least one of the components of the color space model, and the determining of the image data of the third image may be performed for the components separately.

In the fifth embodiment of the present invention, the color space model may for instance be the YUV model, and the determining of the image data of the third image may be performed for the U and V component only. As an Y component for the third image, then for instance the Y component of the main image may be used.

In the fifth embodiment of the present invention, the color space model may for instance be the YUV model, and the determining of the image data of the third image may be performed for the U, V and Y component.

These and other aspects of the invention will be apparent from and elucidated with reference to the embodiments described hereinafter.

DETAILED DESCRIPTION OF THE INVENTION

Figure 1A:
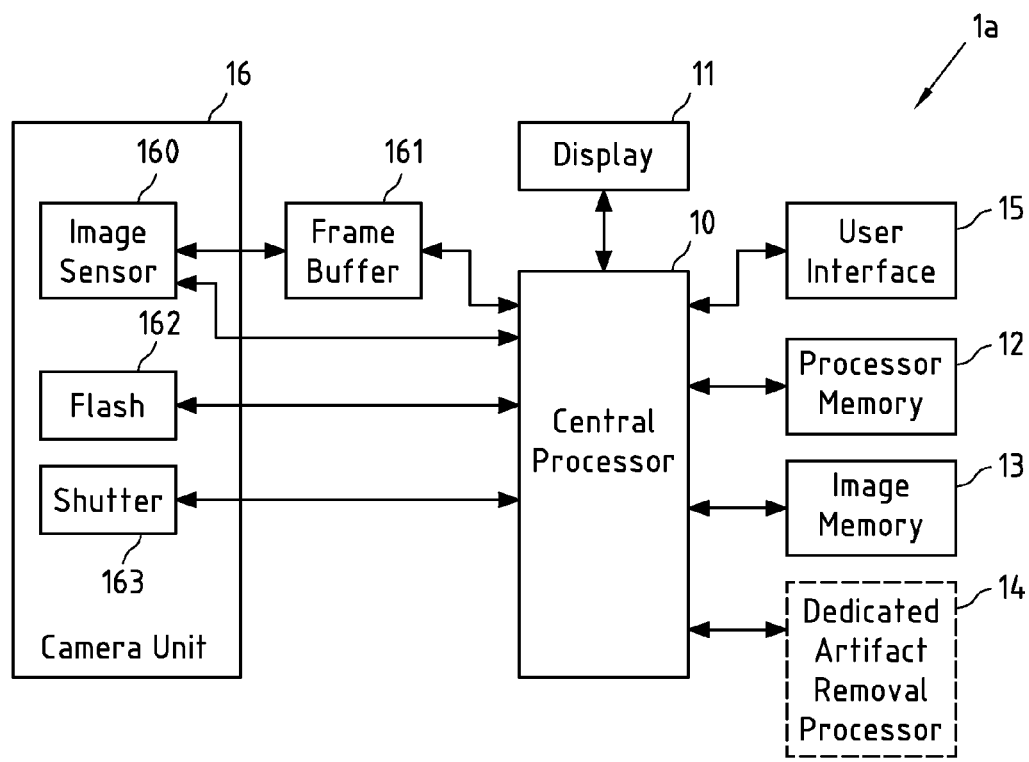
FIG. 1a: a schematic block diagram of an exemplary embodiment of an apparatus according to the present invention.

FIG. 1a depicts a schematic block diagram of an exemplary embodiment of an apparatus 1a according to the present invention. Apparatus 1a comprises a camera unit 16 for capturing images using different levels of flash energy.

To this end, camera unit 16 comprises an image sensor, such as for instance a Charge Coupled Device (CCD) or a Complementary Metal Oxide Semiconductor (CMOS) image sensor, which is configured to capture images projected onto its surface via according camera optics. Images captured by image sensor 160 are at least temporarily stored in frame buffer 161, which may be configured to store more than one images at a time. Image sensor 160 may furthermore be equipped with an analog to digital converter for transforming signals representing a captured image into digital data to be stored in frame buffer 161. It should be noted that frame buffer 161 may equally well form a functional block of central processor 10, or a functional block of camera unit 16.

Camera unit 16 further comprises a flash unit 162, which is configured to generate flash light (e.g. flash pulses) with different levels of flash energy, for instance to allow capturing of a reference image with a low level of flash energy, and a main image with a high level of flash energy. The flash unit may for instance be powered by a flash capacitor.

Furthermore, camera unit 16 is equipped with a shutter unit 163, which controls the opening of a shutter controlling projection of images onto the surface of image sensor 160. The shutter may for instance be a rolling shutter or a global shutter, to name but a few possibilities. Furthermore, the shutter may be implemented mechanically or electronically.

It is understood by those skilled in the art that camera unit 16 may comprise further functional units such as for instance an auto focus unit for controlling an auto focus operation of camera unit 16, or similar units.

Apparatus 1a further comprises a central processor 10 for controlling the overall operation of apparatus 1a. In particular, central processor 10 is configured to control image sensor 160, frame buffer 161, flash unit 162 and shutter unit 163 thus to allow capturing of subsequent images with different levels of flash energy, for instance a reference image with a low level of flash energy, and a main image with a high level of flash energy.

Apparatus 1a further comprises display 11, a user interface 15 and an image memory 13 for storing captured and processed images. Image memory 13 may be embodied as fixedly built-in or removable memory, such as for instance a memory stick or card. Display 11, user interface 15 and image memory 13 are all controlled by central processor 10.

Central processor 10 may run program code stored in processor memory 12, which may furthermore serve as a data memory of central processor 10, and which may for instance be embodied as Random Access Memory (RAM), Read-Only-Memory (ROM), to name but a few possibilities. Processor memory 12 may equally well be embodied as a memory that is removable from apparatus 1a. The program code stored in processor memory 12 may for instance define the way how central processor 10 controls the units of apparatus 1a, and in particular may define how subsequently captured images of different flash levels are processed to remove image artifacts contained therein.

Apparatus 1a may for instance represent a digital camera, where display 11 then may function as a viewfinder and as a means for displaying captured images, and user interface 15 may comprise interaction elements such as a camera trigger, control elements for zooming and control elements for operating a menu structure. Therein, display 11 may also at least partially function as user interface, for instance by displaying a menu structure.

Equally well, apparatus 1a may represent an electronic device that is additionally furnished with functionality to capture subsequent images with different levels of flash energy.

For instance, apparatus 1a may represent a mobile appliance such as a mobile phone, a personal digital assistant or a laptop computer. Therein, central processor 10 may then for instance be the standard processor for controlling the functioning of the mobile appliance, display 11 may be its standard display, and user interface 15 its standard user interface, such as for instance a keyboard or keypad. Similarly, memories 12 and 13 may be standard components already contained in the mobile appliance. In order to furnish the mobile appliance with the functionality to capture images, camera unit 16 may be added to the mobile appliance, and the program code in processor memory 12 may be accordingly altered to enable processor 10 to control camera unit 16 to capture subsequent images with different levels of flash energy, and to remove image artifacts contained therein.

Moreover, FIG. 1a illustrates that apparatus 1a may further comprise a dedicated artifact removal processor 14, which is however optional and thus depicted in dashed lines. Since image artifact removal may be a considerably complex computation task, it may be advantageous to have image artifact removal performed by a dedicated processor architecture, such as for instance an Application Specific Integrated Circuit (ASIC) or a Field Programmable Gate Array (FPGA). The dedicated artifact removal processor 14 then would receive image data of images captured with different levels of flash energy from central processor 10 and would remove image artifacts contained therein, thus to obtain image data of an image without image artifacts.

Figure 1B:
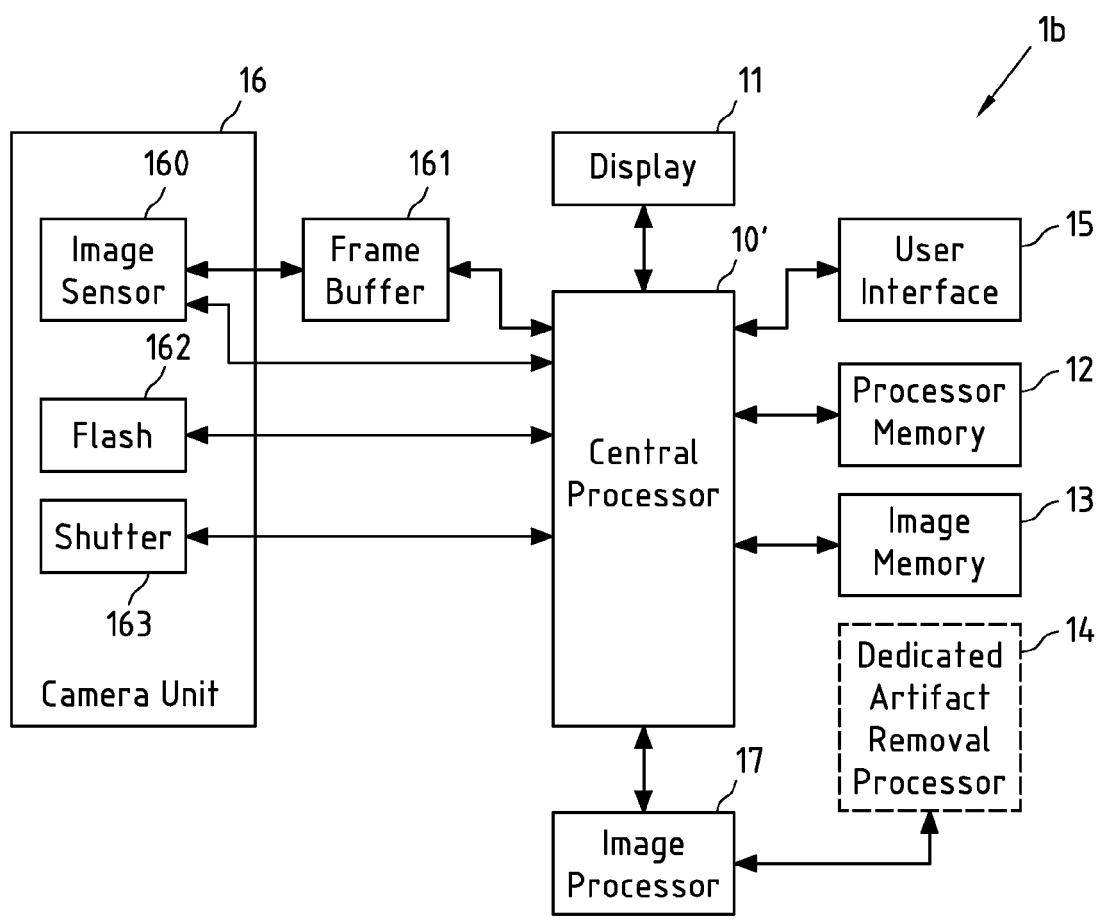
FIG. 1b: a schematic block diagram of a further exemplary embodiment of an apparatus according to the present invention.

FIG. 1b depicts a schematic block diagram of a further exemplary embodiment of an apparatus 1b according to the present invention. In contrast to apparatus 1a of FIG. 1a, in apparatus 1b of FIG. 1b image processing is partially or completely outsourced from central processor 10' to image processor 17. Image processor 17 (which may also be denoted as imaging and video engine) may for instance be embodied via hardwired and/or programmable functional blocks for image processing tasks, inter alia comprising image processing to remove image artifacts according to the present invention. To this end, image processor 17 may comprise internal or external memory for storing a computer program with instructions operable to perform artifact removal according to the present invention. Similar to the apparatus 1a of FIG. 1a, also in the apparatus 1b of FIG. 1b, a dedicated artifact removal processor 14, for instance in the form of a module, may be foreseen to further partially of completely outsource image artifact removal from image processor 17. Furthermore, image processor 17 may directly interface with image memory 13.

Apparatus 1b may for instance represent a digital camera, wherein the units of apparatus 1b then function as already explained with reference to apparatus 1a of FIG. 1a above. Equally well, apparatus 1b may represent an electronic device that is additionally furnished with functionality to capture subsequent images with different levels of flash energy; for instance, apparatus 1b may represent a mobile appliance such as a mobile phone, a personal digital assistant or a laptop computer.

Figure 2:
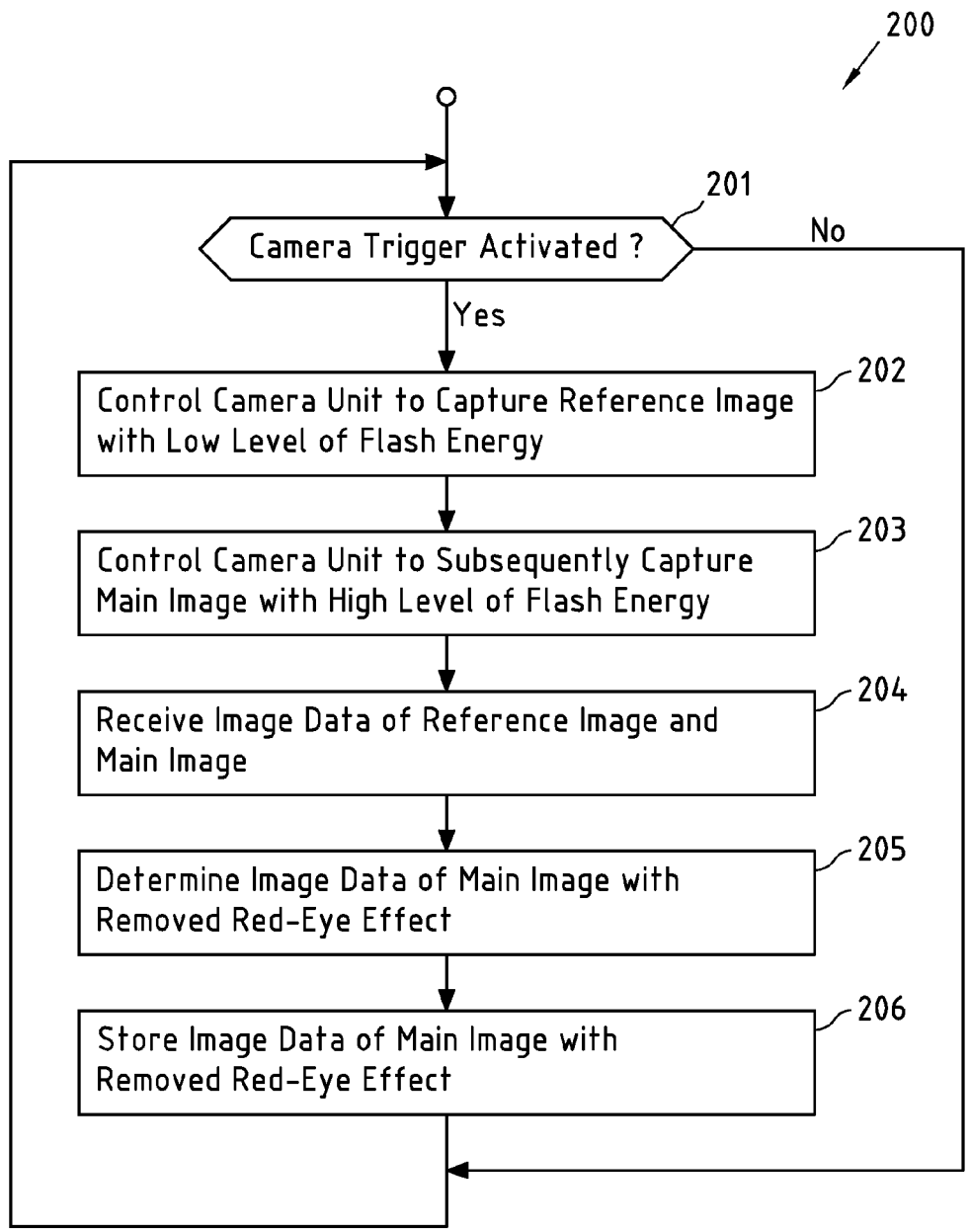
FIG. 2: a flowchart of an exemplary embodiment of a method according to the present invention.

FIG. 2 depicts a flowchart 200 of an exemplary embodiment of a method according to the present invention. The steps of this flowchart may for instance be performed by central processor 10 (and/or optional dedicated artifact removal processor 14) of apparatus 1a (see FIG. 1a), or by central processor 10' and image processor 17 (and/or optional dedicated artifact removal processor 14) of apparatus 1b (see FIG. 1b). Therein, it is exemplarily assumed that an image of a person is to be captured using flash light, so that the artifact that is to be removed from the captured images is the red-eye effect, caused by reflection of the flash light at the blood-rich retina of the person's eye. It is nevertheless understood by a person skilled in the art that the present invention is equally well applicable to the removal of other types of artifacts in flash images, such as for instance reflection of the flash light at the tapetum lucidum that is encountered in a large group of animals (comprising for instance cats and dogs) and causes these animals eyes to unnaturally shine in different colors in the flash image. Furthermore, it is exemplarily assumed that the reference image with a low level of flash energy is captured before the main image with a high level of flash energy. Alternatively, the reference image with the low level of flash energy may also be captured after the main image with the high level of flash energy.

In a first step 201 of flowchart 200, it is checked if a camera trigger has been activated by a user. If this is not the case, the flowchart returns to step 201 in an endless loop to receive any camera trigger activation.

If it is determined in step 201 that the camera trigger has been activated, camera unit 16 is controlled to capture a reference image with a low level of flash energy in a step 202. This reference image may for instance be taken with only 5-10 percent (or even less) of the flash energy that was used for the capture of the main image, and with a short exposure time, for instance 10-50 ms. Therein, the level of flash energy may advantageously be chosen in a way that no red-eye effect or only a minimal red-eye effect is caused, but that the image is still not too dark to allow proper comparison with a main image that will subsequently be taken with a higher level of flash energy. The level of flash energy and exposure time for the reference image may for instance be determined based on the statistics of the viewfinder image data. It should be noted that, in case that the viewfinder image is bright enough, it may also be possible to use the viewfinder image as a reference image and to dispense with the capturing of the reference image at all. Similarly, in some cases it may be beneficial to capture the reference image with zero flash intensity. Furthermore, the reference image may be captured for instance with a lower quality, a lower sampling rate and a lower resolution compared to the main image. This may contribute to saving memory required to temporarily store the reference image in frame buffer 161, since the reference image has to be stored in addition to the main image.

In a step 203, camera unit 16 is controlled to capture a main image with a high level of flash energy, for instance with 100 percent of an available flash capacitor energy. The main image may be captured with full resolution. The level of flash energy and the exposure time may for instance be determined based on the statistics of the viewfinder image and/or the statistics of the reference image. The main image is actually the only desired picture. However, due to the use of flash light with a high level of flash energy required to adequately lighten a person that is to be photographed, also the occurrence of the red-eye effect is inevitable. However, based on information from both the reference image and the main image, the red-eye effect can be removed from the main image, thus obtaining a representation of the main image with removed red-eye effect. This removal of the red-eye effect is simplified when the time delay between the capturing of the reference image and the main image is kept short to avoid major motion and/or content changes. It may thus be advantageous to capture the main image as soon as possible after the capturing of the reference image, for instance not more than 100 ms, in exceptional cases also not more than 200 ms after the capturing of the reference image. For instance, larger delays between the capture of the two images may be possible if motion compensation is applied to one or both of the two images. It should be noted that the main image and the reference picture may furthermore be captured with different exposure times, for instance a shorter exposure time may be used for the main image. Furthermore, it may be advantageous to use the flash in the capture of the reference image as late as possible and in the capture of the main image as early as possible. The positioning of the flash interval within the image capture interval may also be either fixed or variable.

In a step 204, image data of the captured reference image and the captured main image is received. Therein, said image data may for instance be one component (e.g. raw data or Y, U, V, R, G, B) or more components of a color space model, such as for instance the YUV model or the RGB model. It is readily understood by those skilled in the art that the image data of the reference image may equally well be received directly after the capture of the reference image in step 202 and before the capture of the main image in step 203. In step 204, then only the image data of the main image would be received. It then may be possible to dispense with a frame buffer that is capable of storing image data of two images at a time.

In a step 205, image data of a main image with removed red-eye effect is determined. Specific embodiments of this step will be discussed in more detail with respect to the flowcharts 400 of FIGS. 4 and 500 of FIG. 5 below. This determining is based on image data of both the reference and the main image. Therein, it is, inter alia, exploited that the reference image captured with a low level of flash energy most likely does not comprise the red-eye effect, and is taken only shortly before (or alternatively after) the main image, so that a comparison of both images to detect changes therein is possible without suffering too much from artifacts caused by motion and/or scene change.

Finally, in a step 206, the image data of the main image with removed red-eye effect is stored, for instance in image memory 13 (see FIG. 1a/1b). Optionally, said main image with removed red-eye effect may also be displayed on display 11. It may also be possible that the image without removed red-eye-effect is shown on display 11 due to processing latency caused by the red-eye-effect removal procedure. The flowchart then returns to step 201.

Figure 3:
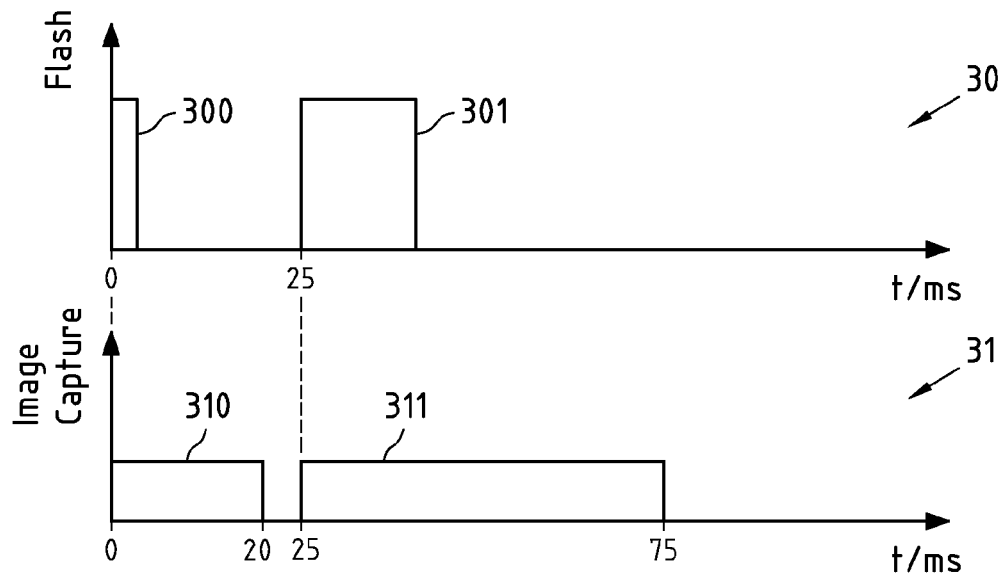
FIG. 3: a schematic illustration of the timing of flash and image capture according to an exemplary embodiment of the present invention.

FIG. 3 schematically illustrates the timing of flash and image capture according to an exemplary embodiment of the present invention. The upper graph 30 illustrates the deployment of a flash light during image capture, and the lower graph 31 illustrates the periods of image capture. It is readily seen that, in this exemplary embodiment, where the reference image is exemplarily captured before the main image, the capturing 310 of the reference image is performed with a short exposure time of 20 ms, and with a low energy flash pulse 300, whereas the capturing 311 of the main image is performed with a longer exposure time of 50 ms, and with a high energy flash pulse 301. Furthermore, the delay between the capturing of the reference image 310 and the capturing of the main image 311 amounts to 5 ms only. As already stated above, the positioning of the intervals where the flashes 300 and 301 are activated within the capturing intervals 310 and 311 are not mandatory. It may for instance be advantageous to activate the low energy flash pulse 300 at the end of the capturing 310 of the reference image. Similarly, the capturing of the reference image 310 and the main image 311 may be performed with different exposure times. Furthermore, the amplitudes of the flashes 300 and 301 may be different.

Figure 4:
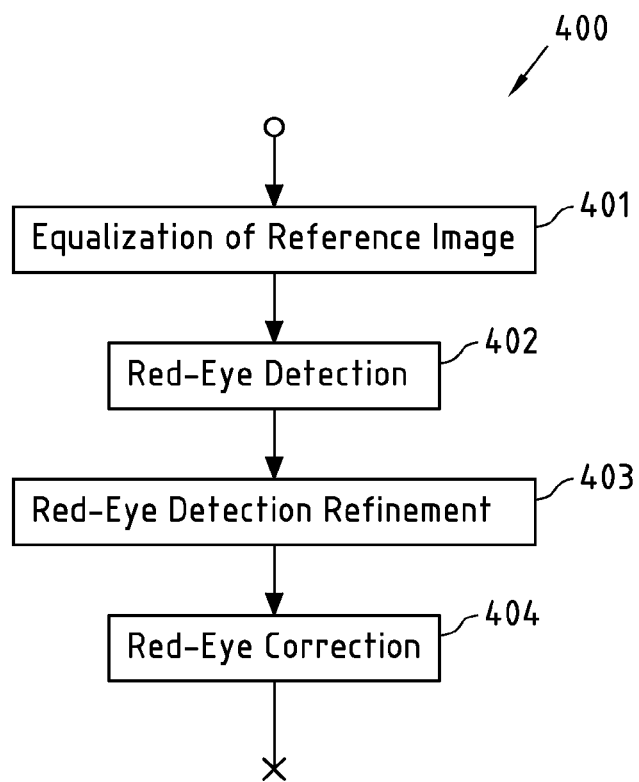
FIG. 4: a flowchart of an exemplary embodiment of step 205 of the flowchart of FIG. 2.

FIG. 4 presents a flowchart 400 of an exemplary embodiment of step 205 of the flowchart of FIG. 2, i.e. an exemplary way how to determine image data of the main image with removed red-eye effect.

In a first step 401, the reference image is equalized, for instance by performing motion compensation, color adjustment, exposure adjustment, scaling or further techniques to make the reference image comparable to the main image. Step 401 is however optional.

In subsequent steps 402-404, the changes between the reference image and the main image are compared to detect and correct red eyes. The level of red color changes considerably at red eye locations. In the reference image, the pupil is almost black, while the pupil is red in the main image. Information about the image changes can be used to determine red eye locations. In the detected areas, then the amount of redness (e.g. the red chrominance channel V of the YUV model, or the R component of the RGB image) needs to be reduced to remove the red eyes.

To this end, in a step 402, a red-eye detection is performed based on image data of the main image. A red-eye detection algorithm using techniques such as for instance face detection or eye detection is deployed to find red eyes in the main image. As an output, this algorithm produces information that characterizes red eye candidates in the main image, such as for instance a binary map of potential red eye pixels, or a set of coordinates, shapes and sizes of potential red eye pixels. The algorithm may be parameterized so that the detection rate is high at the expense of high false positive rate. This is possible, since the following step 403 of flowchart 400, which is red-eye detection refinement, takes care of removing false positives. Allowing more false positives here may reduce the complexity of detection.

In a step 403, red-eye detection refinement is performed by excluding false positives from the information obtained from red-eye detection in step 402. Red-eye detection refinement is based on changes between the reference image and the main image, for instance by analyzing color changes in red eye candidate locations and around them. For instance, only red-eye candidate locations that are associated with a significant change (e.g. from dark color in the reference image to red color in the main image) may be considered as true positives. It may also be possible to utilize e.g. face detection information when the red-eye detection refinement is performed. If the face detection method is very robust this information may also be utilized for limiting the number of red-eye candidates in the red-eye detection of step 402.

Finally, in a step 404, red-eye correction is performed using a red-eye correction algorithm that utilizes the information on the red-eye candidates obtained from step 403 and corrects the red-eye candidates in the main image, thus obtaining a main image with removed red-eye effect. Therein, image data from the reference image may be used to correct the red-eye candidates. It is known to a person skilled in the art that a plurality of red-eye correction methods can be applied here. Examples of such red-eye correction methods are described in the following references:

- Georg Petschnigg, Maneesh Agrawala, Hugues Hoppe, Richard Szeliski, Michael Cohen, Kentaro Toyama. "Digital Photography with Flash and No-Flash Image Pairs". ACM Transactions on Graphics (Proceedings of SIGGRAPH 2004), 2004.
- GAUBATZ, M., AND ULICHNEY, R., 2002. "Automatic red-eye detection and correction". IEEE International Conference on Image Processing, pp. 804-807.
- PATTI, A., KONSTANTINIDES, K., TRETTER, D. AND LIN, Q., 1998. "Automatic digital redeye reduction". IEEE International Conference on Image Processing, pp. 55-59.
- Huitao Luo, Yen J., Tretter D. "An efficient automatic red-eye detection and correction algorithm", ICPR 2004. Proceedings of the 17th International Conference on Pattern Recognition, Volume 2, 23-26, Aug. 2004 Page(s):883-886.

A further example for a red-eye correction algorithm applicable in step 404 will be discussed with reference to the flowchart 500 of FIG. 5 below.

It should be noted that, instead of performing red-eye detection in step 402 based on image data of the main image only, this red-eye detection may equally well be based on image data of both the reference image and the main image. Furthermore, the red-eye detection refinement in step 403 then may be performed based on image data of a single image, either the reference image or the main image. This may reduce the computational time needed for the single-image red-eye detection refinement (e.g. based on face/eye shape detection), since fewer locations may need to be searched.

Figure 5:
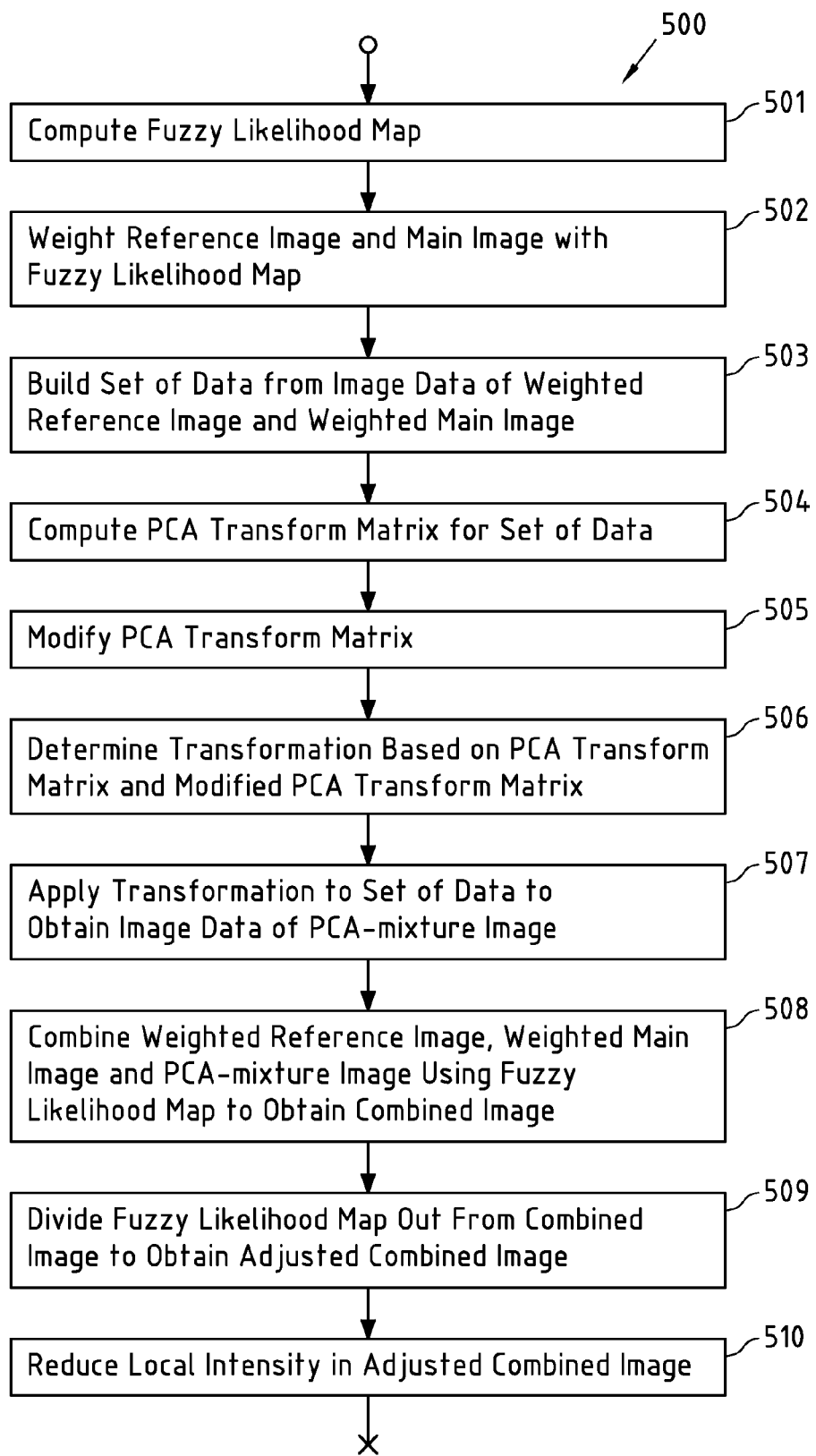
FIG. 5: a flowchart of a further exemplary embodiment of step 205 of the flowchart of FIG. 2.

FIG. 5 presents a flowchart 500 of a further exemplary embodiment of step 205 of the flowchart of FIG. 2, i.e. a further exemplary way how to determine image data of the main image with removed red-eye effect. In this exemplary embodiment, it is assumed that the image data of the reference image and the main image are represented by the Y, U and V components of the YUV color space model, wherein Y is the luminance component, and wherein U and V are the chrominance components. Of course, also other color spaces are feasible, such as the raw image data domain or the RGB domain.

In a first step 501, a fuzzy likelihood map is determined, based on the Y, U and V components of the reference image and the main image. This map provides a value in the range [0,1] for each pixel, wherein a larger value describes that the pixel may likely be in a red-eye region.

In a step 502, the reference image and the main image are pixel-wise multiplied by the fuzzy likelihood map, so that the potential red-eye pixels are emphasized in value, thus giving more weight in subsequent computations. This makes crisp thresholds unnecessary, which is advantageous since threshold setting is generally a very difficult task, so that avoiding to set thresholds renders red-eye detection more robust.

The following steps 503-507 are performed separately for at least the chrominance components U and V of the reference image and the main image, wherein the degree of the processing (for instance the amount of modification of the PCA transform matrix in step 505) may be different for the different components.

In step 503, a set of data is built from a chrominance component (U or V) of the weighted reference image and the weighted main image as obtained from step 502. This set of data may for instance comprise the entire V component of the weighted reference image and the entire V component of the weighted main image.

In step 504, a Principal Component Analysis (PCA) is computed for the (component-specific) set of data based on the covariance matrix of the set of data (e.g. weighted V component of main image and weighted V component of reference image). For instance, for the red chrominance component V, a 2×2 PCA transform matrix v may be computed. The PCA transform matrix provides the coefficients for applying the PCA transform on the set of data, where the set of data is separated into two components: one expresses the greatest variability or energy of the joint signal (the common part), and the other expresses the rest, i.e. the differences between the images (the different part). The actual PCA transform of the set of data may not be performed.

In a step 505, the PCA transform matrix obtained in step 504 is modified in such a way that the smaller PCA component (the different part) is suppressed or reversed. For instance, the modification of the PCA transform matrix may be a function of the ratio of the strongest eigenvalue to the weakest eigenvalue, or a fixed parameter. This yields a modified PCA transform matrix VV.

In a step 506, a transformation is determined based on the combination of the PCA transform matrix obtained in step 504 and the modified PCA transform matrix obtained in step 505. This transformation may for instance be defined as the matrix product of the modified PCA transform matrix vv and the transposed PCA transform matrix v, where the transposed matrix applies the forward transform and the non-transposed matrix an inverse transform. When applying the transposed transformation matrix to the set of data, the set of data is thus transformed into a new coordinate system, and by applying the modified transformation matrix, the set of data is transformed back from the new coordinate system, however in a modified way that suppresses or reverses the different part and thus the differences between the image data of the reference image and the image data of the main image. The two transforms above may not be applied separately, but as a combined matrix. The combined transformation then effectively performs forward PCA and modified inverse PCA.

This embodiment, when performed with different parameters, can be used for reducing not only red eye artifacts, but also for adaptive fusing of flash and ambient lightning (re-lightning). This can be achieved by incorporating also the Y component into the PCA processing.

In a step 507, the transformation of step 506 is then applied to the set of data to obtain a chrominance component of a PCA-mixture image. Therein, the chrominance component obtained in step 507 represents a mixture of the chrominance components of the weighted reference image and of the weighted main image.

Steps 503-507 are performed separately for the U and V components of the reference image and the main image. Optionally, steps 503-507 may also be performed for the luminance component Y. If the Y component is not processed, the Y component of the main image may be used for the remaining steps of the flowchart 500.

In a step 508, the weighted reference image, the weighted main image and the PCA-mixture image are combined under consideration of the fuzzy likelihood map to obtain a combined image. One such combination may be the average of PCA-mixture image and the reference image weighted with the fuzzy likelihood map combined with the main image weighted with the reverse fuzzy likelihood map. Then the potential red eyes have the pixel values mostly from the PCA-mixture and reference images, and pixels with small likelihood for red eyes have values mostly from the main image.

The procedure (in particular steps 503-508) may be repeated with varying parameters for the respective color space components of the main and reference image (e.g. strong effect for R pair, smaller effect for G and B pairs; or strong effect for V pair, smaller effect for U and no effect for Y pairs).

At this stage of flowchart 500, red pupils, for instance, have been made less red.

In a step 509, the influence of the fuzzy likelihood map, which is also present in the combined image of step 508, is divided out from the combined image to obtain an adjusted combined image.

In a step 510, the intensity of those pixels where the color saturation of the processed image was decreased compared to main image by the preceding steps of flowchart 500 is reduced in order to darken the pupils. These pixels may for instance be identified by determining the difference between the adjusted combined image and the main image. This finally yields a representation of the main image with removed red-eye effect.

As already stated above, it should be noted that the method according to the flowchart 500 of FIG. 5 may also be used as a refinement and/or correction method (steps 403 and 404) in the flowchart 400 of FIG. 4. In this case, the analysis and correction may be made only for the areas that are detected in step 402 and/or 403 of flowchart 400.

One optional feature in the above-described processing is re-lightning where also the luminance component Y is considered.

In a simple implementation, instead of factorization of the Y component, high values of the luminance component Y of the reference image are used, which preserves bright areas in the reference image that are not bright in the main image (e.g. lamps). Such an implementation may for instance be a selection of the highest luminance values of independently scaled Y components of reference and main images. In a more advanced re-lightning implementation, the luminance component Y is included in the PCA processing of steps 503-507.

The embodiment of the present invention described with reference to the flowchart 500 of FIG. 5 uses a reference image (captured with low level of flash energy) and a main image (captured with a higher level of flash energy) weighted by a fuzzy likelihood map to blindly suppress or reverse the locally weighted global color differences between the two images by means of a factor analysis method. This results in red-eye removal without thresholding or pattern recognition steps for finding eyes (eye-shapes) in the images. This makes the present embodiment robust against missed eyes, which is a very annoying feature of some red-eye removal methods (the so-called husky dog effect).

It is readily clear for the skilled person that the embodiment of the present invention described with reference to the flowchart 500 of FIG. 5 above can equally well be applied for artifact removal when the reference image is captured without flash. For instance, the viewfinder image, which is generally captured without flash, may be used as a reference image. Equally well, it may be determined that capturing the reference image with flash is not necessary, since the reference image without flash is already bright enough.

Furthermore, the embodiment of the present invention as depicted in the flowchart 500 of FIG. 5 uses fuzzy weighting when computing potential red-eye pixels, which makes the result spatially smooth, unlike other methods where there may be visible edges between areas where red-eye removal has been applied or not applied.

According to the embodiment of the present invention as depicted in the flowchart 500 of FIG. 5, the price of the gained robustness against missed eyes and crisp color edges may be a slight tendency to alter other colored details than just red eyes. For instance, when comparing the main image and the representation of the main image with removed red-eye effect, one may see some objects, especially red ones in shadow, to have somewhat different color. However, to the end user this is not a problem as long as the image looks natural, because the user, when capturing an image, will not see the main image, but only the (flash-less) viewfinder image. The small changes in colors are much more tolerable than missed eyes.

The embodiment of the present invention as depicted in the flowchart 500 of FIG. 5 can be used in re-lightning by balancing also the intensity (luminance) differences in addition to the color differences (see steps 503-507). The advantage for both red-eye removal and re-lightning is that this embodiment computes the PCA transfer matrix based on the current image data, and only the amount of modification of this data-driven matrix may be set by parameter values, for instance by parameter values that define how much the weakest PCA component is reduced or reversed. E.g. it may be set a strong effect for R pair, smaller effect for G and B pairs; or strong effect for V pair, smaller effect for U and medium effect for Y pairs). The parameters thus do not define by which amount the color components of the reference image and the main image are combined. Furthermore, these amounts are computed on-the-fly, and the parameters do not specify the required redness difference threshold for the red-eye removal operation to take place.

The embodiment of the present invention as depicted in the flowchart 500 of FIG. 5 is not limited to PCA; also other factor analysis methods may be used, such as Independent Component Analysis (ICA), for separating the common part and the different part of the reference image and the main image. Also, this embodiment is not limited to using the YUV color space. Equally well, other color spaces can be used. For instance, the embodiment may be used in the RGB space either before or after Bayer de-mosaicing.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

The invention claimed is:

1. A method, comprising:
receiving at least image data of a reference image captured using a first level of flash energy and image data of a main image captured using a second level of flash energy that is higher than said first level of flash energy; and
determining image data of a third image at least based on said image data of said reference image and said image data of said main image, wherein said third image is a representation of said main image with removed artifacts,
wherein said determining of said image data of said third image comprises performing a factor analysis of a set of data formed from said image data of said reference image and said image data of said main image, and applying a transformation matrix obtained from said factor analysis to said set of data to obtain image data of a fourth image;
wherein said image data of said third image is determined at least based on said image data of said fourth image;
wherein said factor analysis is a principal component analysis of said set of data, said principal component analysis determining a common part and a different part with respect to said image data of said reference image and said image data of said main image; and
wherein said transformation matrix is a matrix obtained from said principal component analysis and a modified transformation matrix determined to suppress or reverse said different part.

2. The method according to claim 1, wherein a temporal distance between the capture of the reference image and the main image is less than 100 ms.

3. The method according to claim 1, wherein said first level of flash energy is less than 10 percent of said second level of flash energy.

4. The method according to claim 1, wherein said reference image has at least one of a lower quality, a lower sampling rate and a lower resolution than said main image.

5. A non-transitory computer-readable medium having a computer program stored thereon, the computer program comprising: instructions operable to cause a processor to receive at least image data of a reference image captured using a first level of flash energy and image data of a main image captured using a second level of flash energy that is higher than said first level of flash energy; and
instructions operable to cause a processor to determine image data of a third image at least based on said image data of said reference image and said image data of said main image, wherein said third image is a representation of said main image with removed artifacts,
wherein said determining of said image data of said third image comprises performing a factor analysis of a set of data formed from said image data of said reference image and said image data of said main image, and applying a transformation matrix obtained from said factor analysis to said set of data to obtain image data of a fourth image;
wherein said image data of said third image is determined at least based on said image data of said fourth image;
wherein said factor analysis is a principal component analysis of said set of data, said principal component analysis determining a common part and a different part with respect to said image data of said reference image and said image data of said main image; and wherein said transformation matrix is a matrix obtained from said principal component analysis and a modified transformation matrix determined to suppress or reverse said different part.

6. The non-transitory computer-readable medium according to claim 5, wherein a temporal distance between the capture of said reference image and said main image is less than 100 ms.

7. An apparatus, comprising a processor, said processor being configured:
- to receive at least image data of a reference image captured using a first level of flash energy and image data of a main image captured using a second level of flash energy that is higher than said first level of flash energy; and
- to determine image data of a third image at least based on said image data of said reference image and said image data of said main image, wherein said third image is a representation of said main image with removed artifacts,
- wherein said determining of said image data of said third image comprises performing a factor analysis of a set of data formed from said image data of said reference image and said image data of said main image, and applying a transformation matrix obtained from said factor analysis to said set of data to obtain image data of a fourth image;
- wherein said image data of said third image is determined at least based on said image data of said fourth image;
- wherein said factor analysis is a principal component analysis of said set of data, said principal component analysis determining a common part and a different part with respect to said image data of said reference image and said image data of said main image; and
- wherein said transformation matrix is a matrix obtained from said principal component analysis and a modified transformation matrix determined to suppress or reverse said different part.

8. The apparatus according to claim 7, further comprising a camera unit configured to capture said reference image and said main image.

9. The apparatus according to claims 7, wherein a temporal distance between a capture of said reference image and said main image is less than 100 ms.

10. The apparatus according to claim 7, wherein said first level of flash energy is less than 10 percent of said second level of flash energy.

11. The apparatus according to claim 7, wherein said reference image has at least one of a lower quality, a lower sampling rate and a lower resolution than said main image.

12. The apparatus according to claim 7, wherein said processor is configured to determine a fuzzy likelihood map based on information from said reference image and said main image, wherein said fuzzy likelihood map indicates whether parts of said main image contain an artifact or not, and wherein said processor is configured to weight said image data of said reference image and said image data of said main image with said fuzzy likelihood map before said factor analysis is performed.

13. The apparatus according to claim 12, wherein said processor is further configured to determine said image data of said third image based on said image data of said reference image, said image data of said main image and said image data of said fourth image under consideration of said fuzzy likelihood map.

14. The apparatus according to claim 13, wherein said processor is further configured to remove an influence of said fuzzy likelihood map from said image data of said third image.

15. The apparatus according to claim 7, wherein said processor is further configured to reduce an intensity of portions of said third image.

16. The apparatus according to claim 7, wherein said image data represents components of a color space model, wherein said processor is configured to determine said image data of said third image for at least one of said components of said color space model, and wherein said processor is configured to determine said image data of said third image for said components separately.

17. The apparatus according to claim 16, wherein said color space model is the YUV model, and wherein said processor is configured to determine said image data of said third image for the U and V component only.

18. The apparatus according to claim 16, wherein said color space model is the YUV model, and wherein said processor is configured to determine said image data of said third image for the U, V and Y component.

* * * * *